(No Model.)
J. U. LLOYD.
METHOD OF AND APPARATUS FOR EXTRACTING NICOTINE.
No. 597,804. Patented Jan. 25, 1898.
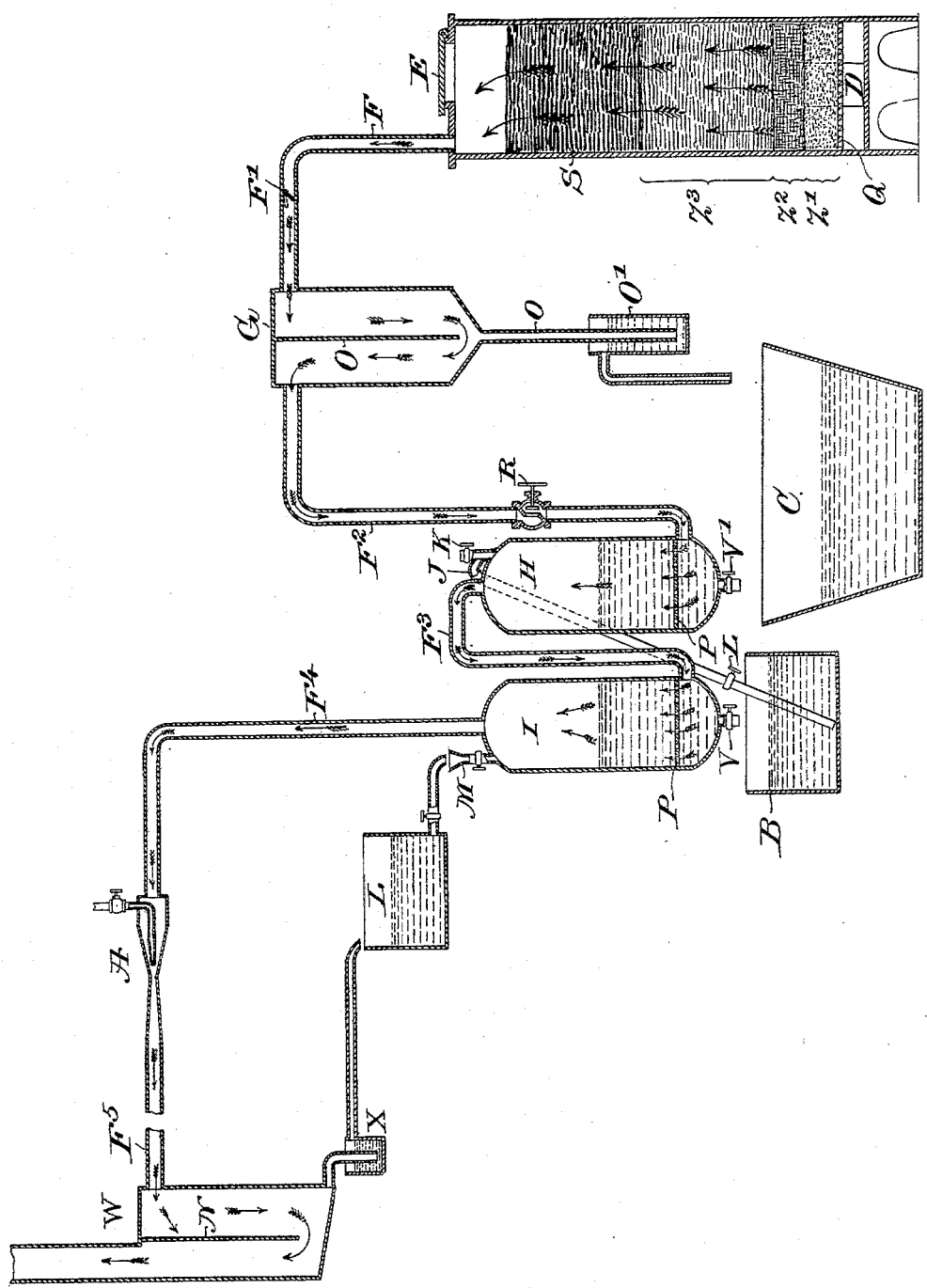
Witnesses.
Eleanor F. v. Groll.
Cora J. Howe
Inventor:
John Ur Lloyd
By his Attorneys,
Langer & Roberts
THE NORRIS PETERS CO., PHOTO-LITHO., WASHINGTON, D. C.

UNITED STATES PATENT OFFICE.

JOHN URI LLOYD, OF CINCINNATI, OHIO.

METHOD OF AND APPARATUS FOR EXTRACTING NICOTINE.

SPECIFICATION forming part of Letters Patent No. 597,804, dated January 25, 1898.

Application filed August 22, 1896. Serial No. 603,662. (No model.)

*To all whom it may concern:*

Be it known that I, JOHN URI LLOYD, a citizen of the United States, residing at Cincinnati, in the county of Hamilton and State of Ohio, have invented a new and useful Improvement in Methods of and Apparatus for Extracting Nicotine, of which the following is a specification.

This invention consists of an improved mode of obtaining the salts of nicotine or kindred alkaloids in a concentrated state from the vegetable substances which contain them.

The vegetable alkaloids are best represented for the purposes of this specification by the familiar alkaloid of the tobacco-plant, nicotine. Therefore for the sake of brevity and simplicity the descriptive portion of this specification will be restricted to the extraction and recovery of nicotine from tobacco stems and leaf refuse; but it is clearly to be understood that other alkaloids than nicotine may be obtained by the process described without departing therefrom in any material particulars.

Nicotine is liberated by volatilization from the vegetable fiber containing it at a temperature of about 225° centigrade. The recovery of volatilized nicotine is, however, conditional upon its not coming in contact with flame or with a red heat.

By means of the process and apparatus herein described nicotine may be completely distilled from tobacco-waste and recovered in solutions susceptible of being brought to a high degree of concentration, while at the same time the operation is carried on at small cost, all the products and by-products of the process being available for useful purposes. The distillation by this process is open, the requisite heat being supplied by the combustion of part of the tobacco-waste. This combustion is carefully regulated, and all the resulting ash, tar, and ammonia are preserved.

The process will be understood in detail by reference to the drawings and the following description, which is addressed thereto.

The furnace or retort S is charged with tobacco stems and waste through the feed-hole at E. The structure connected with the furnace S consists of a system of trapped passages, as follows: A flue F emerges from the top of furnace S and forms a passage for the products of combustion and volatilization from the furnace. This passage enlarges first in the form of a trap O, which contains a baffle-plate, (shown in section at G.) From the bottom of trap O there is an outlet $o$, which dips in the vessel O'. Passing from the trap O the passage continues as the flue $F^2$ to the tank H, and from tank H to tank I as pipe $F^3$, and then from tank I as pipe $F^4$ to the steam-aspirator A, which intervenes and forms part of the continuous system. From the aspirator A the pipe $F^5$ passes into the final trap W, wherein are suspended or fixed a number of baffle-plates, such as N. From trap W the pipe $F^6$ leads to the outer atmosphere.

A subsidiary feature of construction is the valve F', which closes automatically to prevent any back draft to furnace S.

R is a valve in flue $F^2$, which can be closed by hand for purposes hereinafter to be described.

C is a storage-tank to receive the liquid drawn from tank H. Such liquid carries a large percentage of nicotine and ammonia in solution and is ready for concentration, as hereinafter mentioned. C also catches the liquid from trap O'.

B is a receptacle for the liquid of tank I.

J is a pipe connecting the bottom of receptacle B with the top of tank H.

K is a valve for opening or closing pipe L.

In the top of tank I is a funneled inlet M, adapted to receive the contents of the tank L, which in its turn receives the liquors from the trap vessel W, wherein they have been condensed. Strainer-plates P P for distributing the vapor-current are located in tanks H and I.

When the aspirator A is in action, the valve R being open and valves K and L closed, the vapors contained in the "F system" are drawn through the successive pipes and tanks. In each tank there is a quantity of dilute sulfuric acid. Oxalic, phosphoric, or tartaric acid could be used in these tanks, or instead of an acid solution any kind of oil in which nicotine is soluble (such as one of the heavier petroleum distillates) might be substituted, but it is believed that such a substitution would involve a sacrifice of economy.

Instead of an aspirator at A a fan or pump exhauster may be employed with good results, but it is believed that such a contrivance is not susceptible of so nice local adjustment as the aspirator.

The furnace S is charged with tobacco stems and scraps through the feed-hole at E. The draft is then turned on at A and the tobacco-stems or some suitable kindlings are ignited at the bottom of the column of vegetable fiber in the furnace S. Doors D are provided with the usual dampers and air-inlets in such manner that the air is admitted evenly through the mass at the bottom of the furnace. The perforated false bottom Q assists the even distribution of air through the furnace. Ashes may be withdrawn from the said doors when desired.

The heat of combustion in the burning-zone passes up through the mass of tobacco and volatilizes the nicotine and kindred alkaloids. The draft carries over into the pipes F $F^2$, &c., and the connected vessels all the smoke and vapor which contain the nicotine and other alkaloids, ammonia, and tar.

The trap O, for which any ordinary tar-scrubber might be substituted, intercepts a large portion of the tar and water carried over in the vapors, which pass therefrom to the tank H and are sucked through the liquid in the trap formed by tank H and the lower end of the pipe $F^2$. The grating P breaks up the stream of nicotine-laden vapor and distributes the rising bubbles all through the liquid in tank H. The tarry products are delivered by pipe O to trap O', from the top of which the tar and liquids intercepted run off into tank C. The vapors are similarly drawn through the system comprising tank I and trap vessel W. In each tank the vapors pass through dilute sulfuric or equivalent acid which takes up the nicotine, so that when the exhausted products of combustion are at last passed from trap-tank W to the chimney practically all the valuable ingredients have been intercepted.

The liquor in the distilling apparatus should be used progressively. From trap-tank W the liquid is drawn automatically into the vessel L, where acid is introduced. Tank I is supplied through M with the liquor of vessel L. Tank I delivers its liquor to vessel B when liquor in tank H has reached its point of maximum concentration and been drawn out.

Tank H is supplied from vessel B through pipe J in the following manner: Normally valve R is open and valves $k$ and $l$ closed. Close valve R and open valve L and then drain the strong liquor from H through V' into tank C. Then close valves V' and K, and open valve $l$. The suction at A is then increased until it is strong enough to draw the liquor from B through pipe J into tank H. During this interval when valve R is closed a good opportunity is offered for feeding a fresh supply of tobacco-stems into S. All the nicotine-reclaiming liquid finds its way eventually into tank C, and from this liquid the nicotine solution may be concentrated to a desired degree in any usual manner.

Tanks H and I may be reduplicated as many times as may be found necessary for thorough extraction of the ammonia and alkaloids. A series of four such tanks and holding a column of dilute sulfuric acid (six-per-cent. solution) about eighteen inches high above the perforated screen P will take out of the passing vapors substantially all the ammonia and alkaloids.

In operation the tanks H and I are filled with a six-per-cent. solution of sulfuric acid to a level of about eighteen inches above the screens P. Fire is started in the burner and the draft at A turned on. As the burning progresses through the mass of tobacco-stems in S fresh stems are fed in through F at a rate equal to about one hundred pounds per hour for every seven square feet of cross-section of the column of fuel. The ashes are drawn out at D. After four hours' run all the acid in tank H will have become neutralized by the ammonia and alkaloids passing through. Tank H is then emptied into the storage-tank C, and the contents of the successive vessels in the system are moved up one tank toward the furnace and fresh acid is introduced into the tank L to replenish it. The liquid in the storage-tank C is allowed to settle from the tar, is concentrated, and the sulfate of ammonia therein separated out by percolation with alcohol.

In performing the above-described operation it is important to preserve the burning-zone and the volatilization-zone in the furnace in distinct separation, because the purpose of the process will be in whole or in part defeated if the nicotine is brought in contact with a red heat or with flame. Therefore the combustion should be made to progress uniformly through the mass in such manner that the nicotine will all be volatilized before the vegetable fiber reaches an incandescent heat. Then when the flame finally reaches any given mass of fiber it will have been reduced to a charcoal-like fuel well adapted to complete and uniform combustion.

During the progress of volatilization of the nicotine, &c., from the column of fiber in the tobacco-furnace it is well to watch the distribution of the combustion, charring, and volatilization zones, the better to guard against any undue local advance of the combustion. For this purpose there may be inserted long narrow glasses in the side of the furnace at convenient intervals around the drum of it. The definition of the zones will be perceptible to the operator who may adjust the progress of combustion from time to time.

The zones of burning, &c., are of course not clearly and sharply marked and blend to some extent, but are none the less distinct from each other to the practical observer.

The volatilization-zone may be understood as being limited on the one side by the region where nicotine, &c., begins to be given off from the surface of the fragments which constitute the column of material and on the other side by the region wherein the last of the nicotine is driven from the heart of the fibrous fragments. Very likely this latter region is close to if not part of the stratum where the fibers begin to char; but so long as the nicotine, &c., is not reached by flame or a red heat the process is unimpaired.

I claim—

1. The process of extracting nicotine and kindred alkaloids of tobacco, which consists in igniting a column of tobacco at one end while confined in a chamber, whereby the alkaloid is liberated in advance of combustion, drawing the liberated alkaloid vapors through the mass of unburned tobacco, and then absorbing the alkaloid vapors in an acid solution.

2. The process of extracting nicotine and kindred alkaloids of tobacco, which consists in evenly burning in strata a column of tobacco fiber while confined in a chamber, whereby the alkaloid is liberated in advance of combustion, drawing the vapors away from the stratum of combustion through the mass of unburned tobacco, thereby removing such vapors from the direct influence of the heat of combustion and consequent chemical change, and then recovering the said chemically-unchanged alkaloid, substantially as described.

3. The process of extracting nicotine and kindred alkaloids of tobacco, which consists in igniting a column of tobacco at the lower end while confined in a chamber, whereby the nicotine is liberated in advance of combustion, drawing the liberated nicotine-vapors through the mass of unburned tobacco, and then absorbing the said nicotine-vapors in an acid solution.

4. The process of extracting nicotine and kindred alkaloids, which consists in igniting a column of tobacco at the lower end, in a closed chamber, whereby the nicotine is liberated in advance of combustion, drawing the products of combustion through the mass of unburned tobacco and thereby volatilizing the alkaloid, and then absorbing the vapors in an acid solution.

5. The method of extraction of nicotine or kindred alkaloids, which consists in igniting from the lower end a column of material containing the alkaloid, causing the consequent combustion to progress up through the column, thereby volatilizing the alkaloid in advance of combustion, and regulating the progress of the combustion so that there lie across the column of material, defined and substantially parallel zones, namely, a zone of combustion and incandescent heat, a zone of partial combustion wherein the material is charred gradually by the proximity of the combustion-zone, and a zone wherein the heat rising from the combustion-zone volatilizes the alkaloid, meanwhile conveying away and recovering the volatilized alkaloid.

6. In an apparatus for the distillation of nicotine and kindred volatile alkaloids from vegetable matter containing them, the combination with a chamber adapted to the reception and combustion of the vegetable matter, of a flue wherein are located means, such as a baffle-chamber, to arrest the tarry products of combustion, recovering vessels to contain liquid and through which the vapors are carried successively, means for returning the liquid of each recovering vessel to the vessel next it in a direction toward the combustion-chamber, a valve in the flue between the first recovering vessel and the combustion-chamber, by the closing of which the passage of material to the recovering vessel is checked or arrested, and means whereby an outward draft from the combustion-chamber is maintained throughout the apparatus, substantially as described and for the purposes set forth.

In testimony whereof I have signed my name to this specification in the presence of two subscribing witnesses.

JOHN URI LLOYD.

Witnesses:
GEO. J. MURRAY,
SHERWOOD R. TAYLOR.